INVENTOR.
GERALD R.O. PENTITH

INVENTOR.
GERALD R.O. PENTITH

INVENTOR.
GERALD R. O. PENTITH

ABSTRACT OF THE DISCLOSURE

United States Patent Office 3,420,577
Patented Jan. 7, 1969

Figure 1:
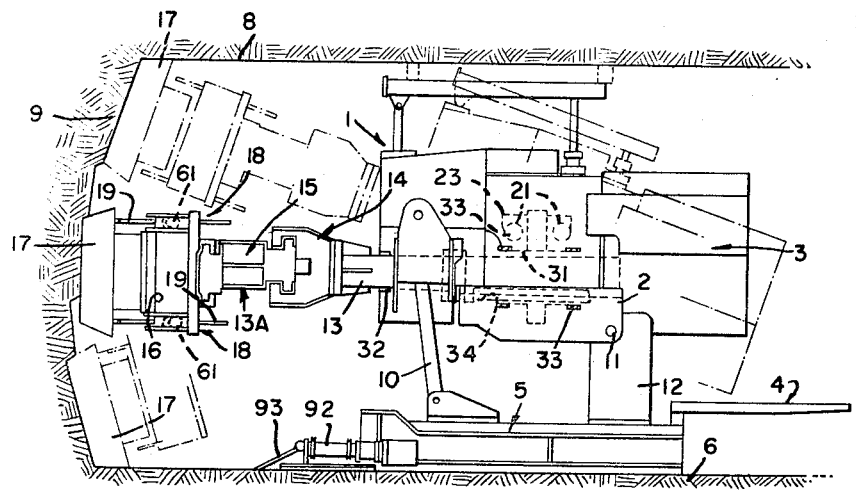

3,420,577
TUNNELLING MACHINE HAVING INDEPENDENTLY OPERABLE CUTTING HEAD AND CIRCULAR SAW
Gerald R. O. Pentith, Aycliffe Industrial Estate, near Darlington, England, assignor, by mesne assignments, to Mining Progress Inc., Highland Mills, N.Y., a corporation of New York
Filed Oct. 12, 1966, Ser. No. 586,237
Claims priority, application Great Britain, Dec. 10, 1965, 52,453/65
U.S. Cl. 299—31      9 Claims
Int. Cl. F21c 29/00

ABSTRACT OF THE DISCLOSURE

Tunnelling machine including a frame normally having a horizontal longitudinal axis, a beam mounted transversely at the front of the frame and rotatable about such longitudinal axis, a pick-mounting cutting head rotatable about an axis parallel to the axis of rotation of the beam, an assembly of at least one rock-cutting circular saw rotatable about an axis transverse to the length of the beam, the cutting head and the saw assembly being slidably mounted on and movable lengthwise of the beam, and means for rotating the beam about its axis, for moving the cutting head and saw assembly along the beam, for rotating the cutting head and the saw assembly about their respective axes and for advancing and retracting the cutting head and the saw assembly in the lengthwise direction of said horizontal longitudinal axis.

---

This invention relates to machines for tunnelling and mining in hard material, its object being to provide a machine capable of removing in a substantially continuous manner even material of very hard, homogeneous character (all such material being generally referred to hereinafter as rock) such as sandstone and granite, as opposed to laminated shales and coal, and thus of effecting tunnelling or mining (for simplicity "tunnelling" will be referred to hereinaffer, but it is to be understood that this term includes mining) in an operation that is substantially continuous, particularly in contrast to the intermittent operation involving cycles of drilling, shot-firing, and rock-removal usual with such rock formations.

According to the present invention, a tunnelling machine comprises a base to be supported in the tunnel that is being cut, a beam mounted transversely at the front of the base and rotatable about a horizontal longitudinal axis, a pick-mounting cutting head rotatable about an axis parallel to the axis of rotation of the beam, an assembly of at least one rock-cutting circular saw rotatable about an axis transverse to the length of the beam, the cutting head and the saw assembly being slidably mounted on and movable lengthwise of the beam, and means for rotating the beam about its axis, for moving the cutting head and the saw assembly along the beam, for rotating the cutting head and the saw assembly about their respective axes, and for advancing and retracting the cutting head and the saw assembly in the lengthwise direction of the machine.

The beam may be constructed in one part but preferably the beam is constituted by two smaller beams one smaller beam being movable in a direction parallel to the longitudinal axis of the other smaller beam, the movable beam carrying the saw assembly and cutting head.

For the cutting of a tunnel of circular cross-section, the axis of rotation of the beam is disposed in the base of the machine to coincide with the axis of the tunnel. However, the machine may be provided with means for shifting the beam axis vertically and/or horizontally so that tunnel sections other than circular can be cut such as horse-shoe, square, etc.

By advancing the saw assembly into the rock face to be cut, in the case of two or more saws, the parallel saws (of appropriate diamond type for the rock to be attacked) form correspondingly parallel saw-kerfs in the rock, in directions parallel to the longitudinal axis of the beam or beams. Then, by movement of the saw assembly along the beam to which it is attached (whether one part construction or two part construction), the kerfs are extended, so that an area of rock face, of width equal to the span of the saws along their axis and of length corresponding to the amount of movement along the beam is subdivided into parallel strips. Into the area thus subdivided, the cutting head is advanced, its picks serving to fragment the rock in the strips by attack on their ends, and also moved along the beam, to continue the fragmentation along the slitted area by endwise attack on the strips.

Preferably, the cutting head and the saw-assembly are mounted for simultaneous movement along the beam, and in close proximity to one another. Thus, both may be mounted on a common carrier slidable along the beam, although the use of separate slidable carriers is not precluded. Whether on a common carrier or on separate carriers, the saw assembly is preferably further advanceable and retractable independently in addition to the cutting head and saw assembly being advanceable and retractable together, with respect to the lengthwise direction of the machine.

Since slitting by the saws precedes fragmentation of the slitted area by the picks of the cutting head, it follows that cutting to the periphery of the tunnel sections must first be performed by the saws which must therefore be in front of the cutting head on the beam in the position occupied by it as the saws move towards the periphery. However, by retraction of the saws and rotation of the beam, the cutting head may now be brought into positic to move along the beam in advance of the (now idle) saws, so that it can operate to the periphery. This it may do by being first advanced into the edges of the strips and then moved along the beam, or by being moved to the end of the beam and then advanced by rotation of the beam.

Cutting by the cutting head may thus proceed along slitted areas running parallel to the length of the beam, or in arcuate areas previously slit by the saws. Thus, for a tunnel of circular cross-section, the rock may be removed by a succession of radial cuts by the saws to the periphery, with the beam progressively rotated, followed by the cutting head, again with the beam progressively rotated about its axis. For a tunnel section other than circular, e.g., square, the beam and its mounting for rotation are adjustably carried from the machine base so as to be movable to positions parallel to one or other dimensions of the cross-section, which enables the saws and the cutting head to be brought in turn to the sides and into each corner of the cross-section.

Hydraulic driving and positioning means may conveniently be used, say with one or more pumps driven by an electric motor in the base of the machine serving hydraulic motors in or geared to the cutting head and saw assembly, or an electric motor for the saw assembly, hydraulic cylinders or rams for moving and locating the cutting head and the saw assembly (via their carrier or carriers) along the beam and for effecting their advance and retraction, and hydraulic cylinders for rotating and locating the beam about its axis of rotation. The machine is advantageously self-advancing, as by having the base carried by lengthwise supports spaced parallel to each other, together with floats and jacks to effect a "walking" movement forwards or backwards. The machine may also include jacks to secure itself in the tunnel already cut, and thus to take the counter-thrusts arising from the advancing of the cutting head or the saw assembly into the rock.

The machine may also incorporate conveying means for the removal of the rock that is being removed substantially continuously from the face. Thus, a gathering conveyor mounted across the front of the machine or one or more transverse scraper chain conveyors may receive much of the fragmented rock directly and discharge it to a conveyor that passes lengthwise through or under the base of the machine. The gathering conveyor may be retractable, so that it can be withdrawn while cutting is proceeding at or near the bottom of the cross-section, and advanced while cutting is proceeding at higher levels.

Figure 2:
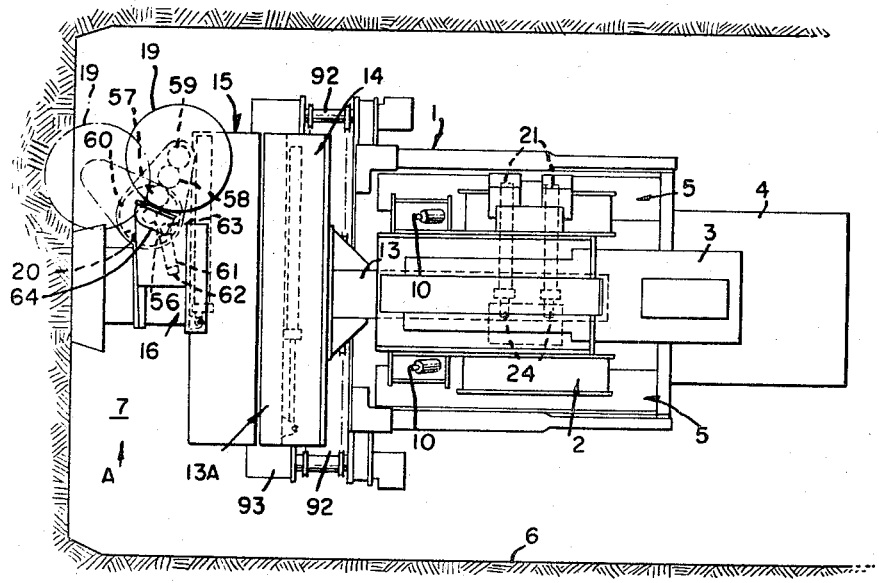
Figure 3:
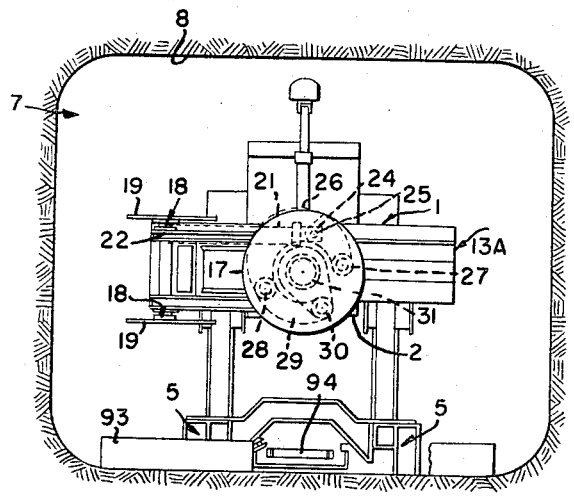
Figure 9:
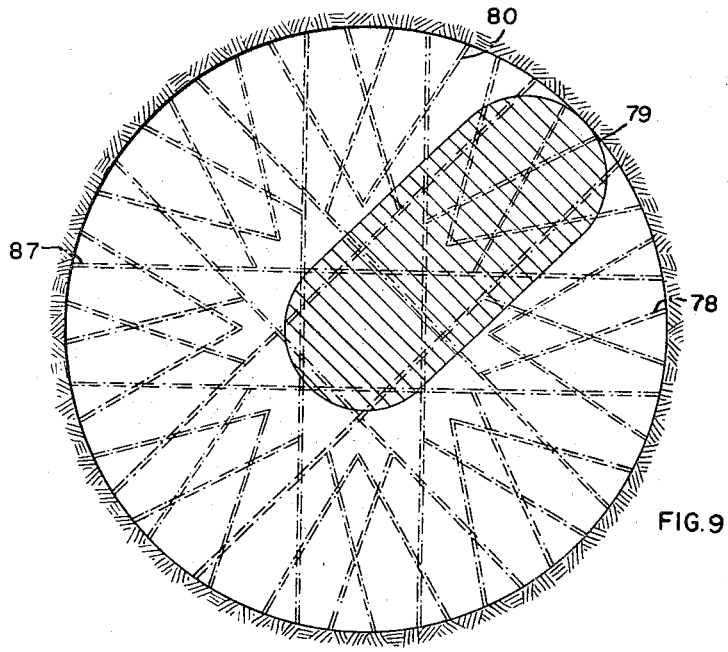
Figure 4:
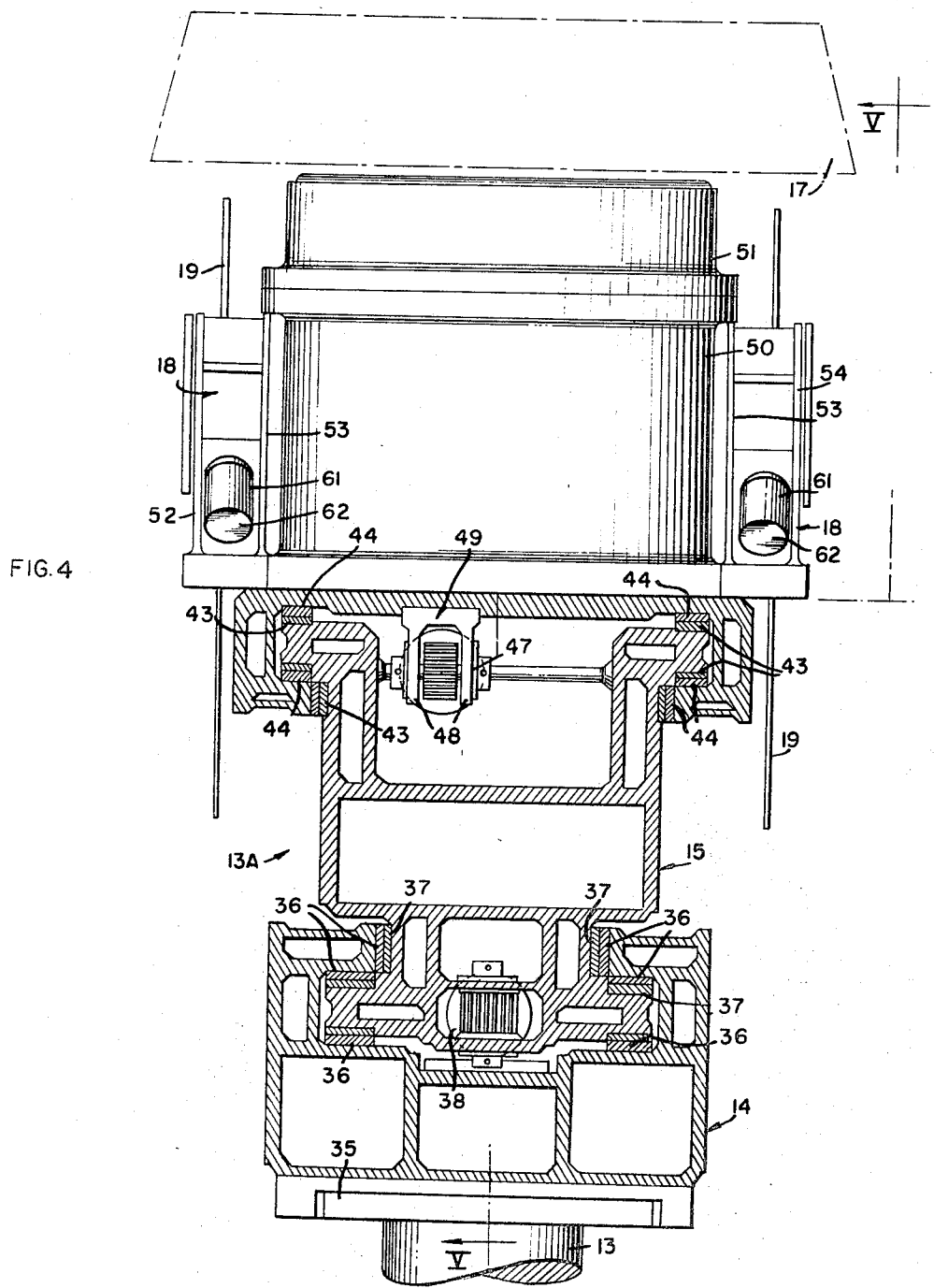
Figure 5:
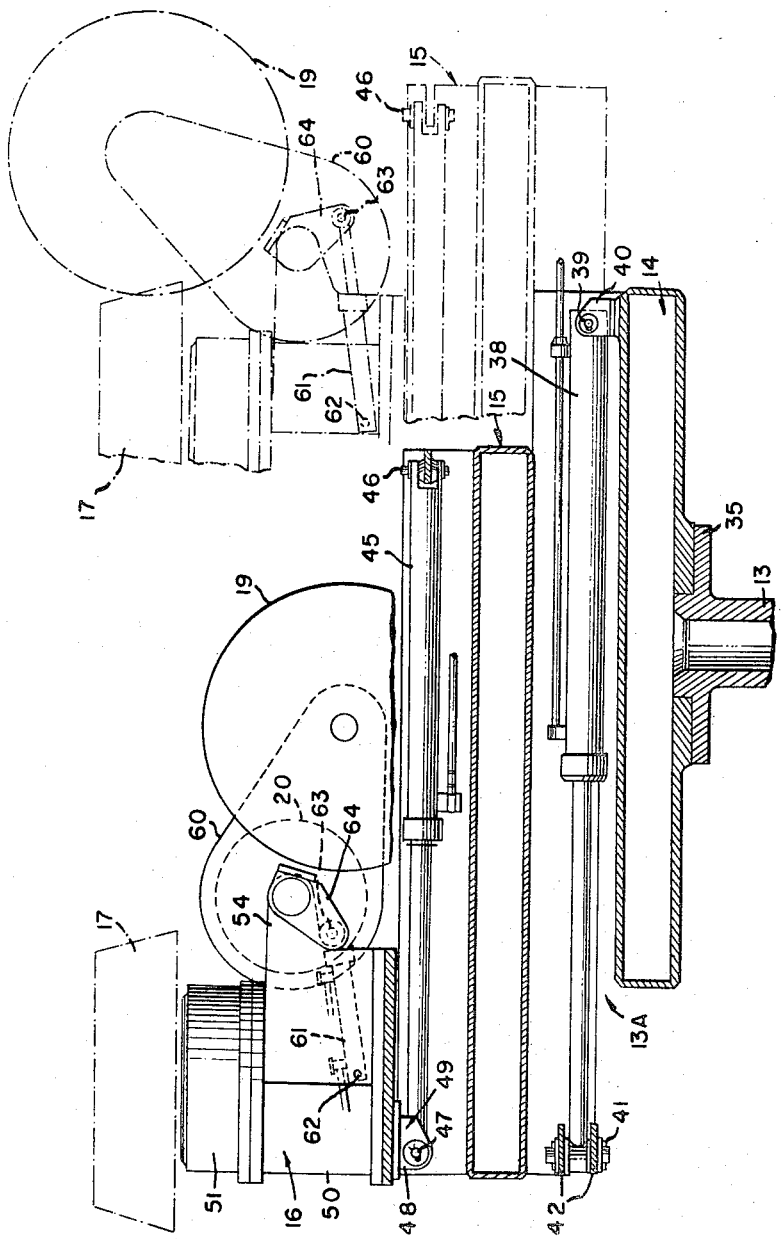
Figure 7A:
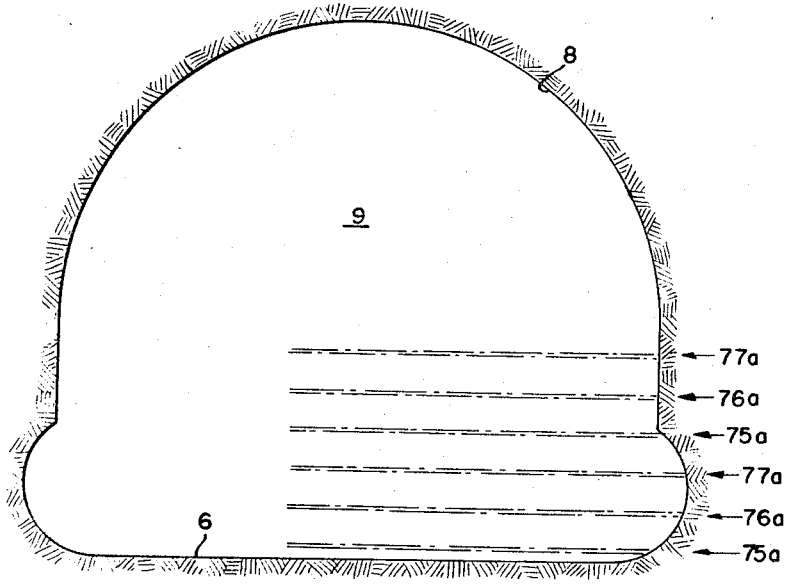
Figure 7B:
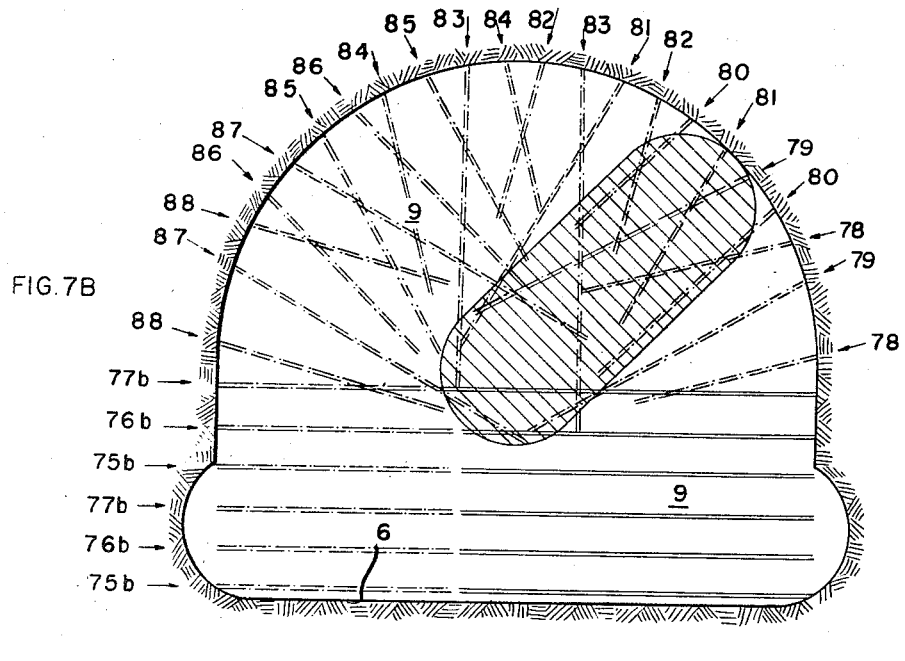
Figure 8:
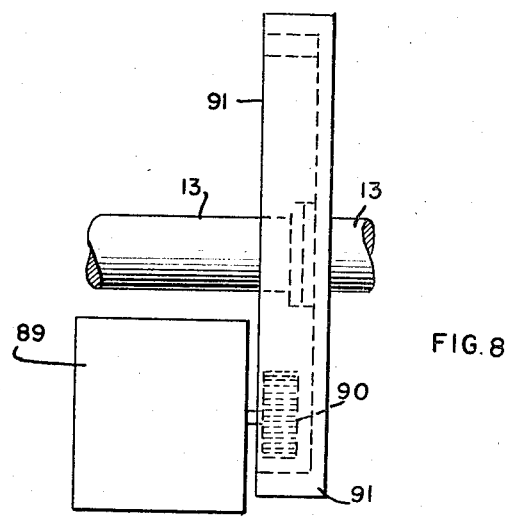

The invention will now be further described with reference to a two saw machine having a two part beam shown in the accompanying drawings, in which:

FIGURE 1 is a side elevation of a tunnelling machine;
FIGURE 2 is a plan view of FIGURE 1;
FIGURE 3 is an end elevation of FIGURE 1;
FIGURE 4 is an enlarged view of the direction of arrow A of FIGURE 2 showing the cutter head, the saws and their supporting and displacing arrangements.
FIGURE 5 is a section on the line V—V of FIGURE 4;
FIGURES 6A–6D show a method of operating the machine on a rectangular section tunnel.
FIGURES 7A and 7B show a method of operating the machine on a D section tunnel; and
FIGURE 8 is a portion of a plan view, similar to FIGURE 2 but showing a modified drive arrangement for the torque shaft;
FIGURE 9 shows a method of operating the modified machine of FIGURE 8 on a circular section tunnel.

In FIGURES 1, 2 and 3 a machine 1 has a main frame 2, including a power unit 3 controlled from an operator's platform 4 at the rear, seating on lengthwise supports 5 spaced apart and parallel to each other, which rest on the floor 6 of a tunnel 7 being cut, having a roof 8 and a face 9, the frame being connected to the base members through, at the front of the machine, a pair of pivoted hydraulic jacks 10, and, at the rear of the machine, a transverse pivot 11 in a transverse beam 12. The upper and lower positions of the machine achieved by actuation of the rams 10 is shown in chain dotted line in FIGURE 1. A torque shaft 13 protrudes from the front of the machine 1 and carries a beam 13A, shown in a horizontal position, consisting of a primary arm 14 and a secondary arm 15, the secondary arm being slidably secured to the primary arm. On the secondary arm 15 is slidably mounted a carrier 16 serving to carry a rotary cutting head 17 provided with picks (not shown) and a saw assembly 18, which consists of a pair of circular saws 19 and an electric drive motor 20 (FIGURES 2 and 5).

The torque shaft 13 is rotated through 180° by two hydraulic cylinders 21 pivoted at 22 each between a pair of plates 23 secured at one side of the frame 2. The cylinders 21 lie substantially horizontally across the frame 2 above the torque shaft 13 and their piston rods 24 are pivoted at 25 intermediately of a curved lever 26 mounted on a fixed pivot 27 in the frame. The lever 26 is pivoted at 28 to a curved link 29, pivoted at 30 to a torque tube 31. This rotating mechanism is described in greater detail in my U.S. patent application Ser. No. 398,954.

The machine is self-propelled and self-steering, the base members 5 being provided with floats and jacks (not shown) to effect a walking movement forwards or backwards as described in my U.S. patent application Ser. No. 398,954, now Patent No. 3,306,663.

Preferably, the operation of the machine, with the exception of the saws, is effected entirely hydraulically from conventional pumps (not shown) in the power unit 3, the pumps being driven by a conventional electric motor (not shown).

The torque shaft 13 is secured forwardly in bearings 32 (FIGURE 1) in the machine frame and rearwardly by the surrounding torque tube 31 mounted in bearings 33 along which the tube can be slid by means of a hydraulic ram 34 as described in my U.S. patent application Ser. No. 398,954, a key enabling the shaft 13 to be rotated by the torque tube.

As can be seen in FIGURE 4 and FIGURE 5 the primary arm 14 is mounted on the flanged end 35 of the torque shaft 13 and is provided with slipper bearings 36, the secondary arm being provided with corresponding and mating slipper bearings 37. The secondary arm 15 is moved along the primary arm 14 by a double acting hydraulically actuated ram 38, pivotally secured at one end on a pin 39 in a bracket 40 bolted to the primary arm 14, and pivotally secured at the other end on a pin 41 secured between webs 42 of the secondary arm. The secondary arm is in turn provided with slipper bearings 43 and the carrier 16 is provided with corresponding and mating slipper bearings 44. The carrier is moved along the secondary arm by a double acting hydraulically actuated ram 45 pivotally secured at one end on a pin 46 (FIGURE 5) and pivotally secured at the other end on a pin 47 secured between webs 48 of a bracket 49 bolted to the carrier 16.

Mounted on the carrier 16 is the rotary cutting head 17 driven by a hydraulic motor (not shown) having a casing 50 driving through reduction gearing (not shown) having a casing 51. Along opposite sides of the hydraulic motor casing 50, parallel to the axis of the torque shaft 13, and from the portion of the carrier adjacent the secondary arm, extend a pair of parallel plates 52, 53 each having an extension 54 at one edge, the innermost plates 53 having secured between them the electric motor 20 to drive the saws. The electric motor is provided with a pinion 56 (FIGURE 2) meshing with gear wheel 57, in turn meshing with gear wheel 58, in turn meshing with a pinion 59 to drive one of the saws (the saws being connected together by a shaft). The gear train 56, 57, 58, 59 is contained in a housing 60 which is pivotally mounted in the extension 54 between plates 52, 53. A pair of double acting hydraulically actuated rams 61 is pivotally mounted on the carrier at 62, its other end being secured at 63 to one end of an arm 64 secured to the housing 60.

In FIGURE 5 the carrier is shown in one extreme position (to the left) i.e., with rams 38 and 45 in the fully extended position with the cutting head in operation and thus with the ram 61 in the fully retracted position. In chain-dotted line to the right of FIGURE 5 is shown the carrier in the other opposite extreme position. However the ram 61 is shown in the fully extended position, i.e., with the saws in operating position.

Figure 6A:
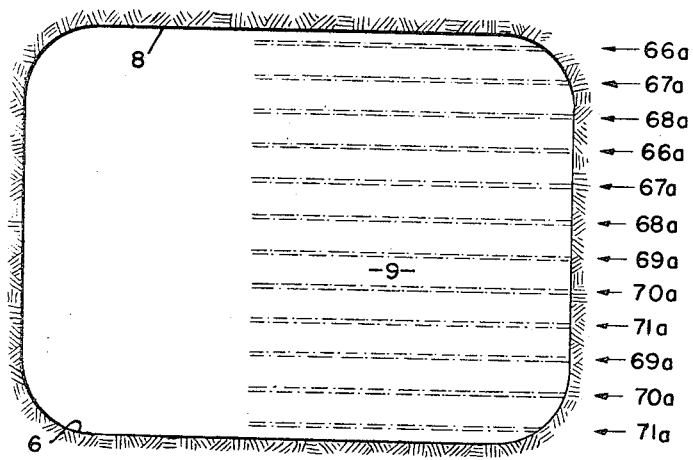

A method of operating the machine to cut a rectangular section tunnel is shown in FIGURES 6A–6D. In this method the primary and secondary arms are put in the horizontal position i.e., with the axis of rotation of the saws vertical with the uppermost saw slightly below the roof 8 in the centre of the tunnel to be cut, by suitable actuation of the jacks 10 and torque shaft 13. With the rams 61 fully extended the saws are then sumped-in by actuation of ram 34 and the carrier traversed to the extreme right by actuation of rams 38 and 45. The saws are then withdrawn by retraction of ram 61. This produces saw kerfs 66a (FIGURE 6A). The arm is then lowered slightly by operation of the jacks 10, a suitable distance being 12" and the saws sumped-in and the carrier traversed to the left. This produces kerfs 67a. Kerfs 68a are produced in exactly the same manner as kerfs 66a. However, to produce kerf 69a by the usual sumping-in and traversing it is obviously necessary, if 12" has been selected as the distance between kerfs, to lower the arms by 48". Kerfs 7a and 71a are produced in the same manner as 67a and 68a. In this manner just over half the whole face 9 may be cut horizontally as can be seen in FIGURE 6A.

Figure 6B:
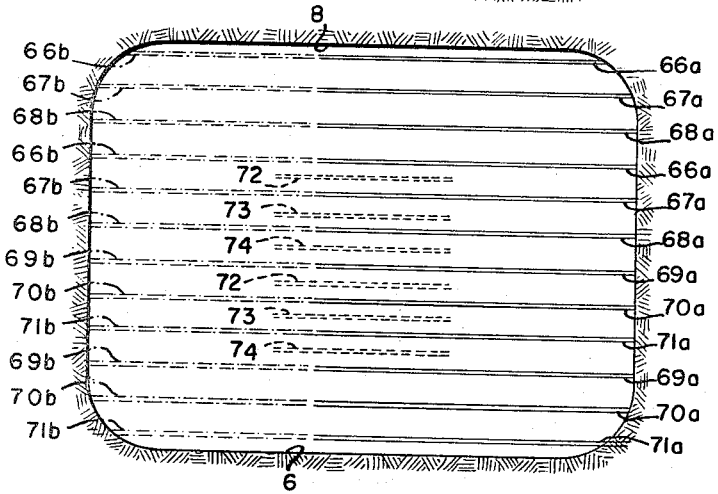

To produce kerfs in the other remaining portion of the face the arm is rotated through 180° and the procedure described above is repeated. This produces kerfs 66b, 67b, 68b, 69b, 70b and 71b (FIGURE 6B). When working in extremely hard material, kerfs 72, 73 and 74 may be made to facilitate sumping-in of the cutter drum. In most cases the depth of kerf may conveniently be in the order of 12" to 24" but could be more or less.

Figure 6C:
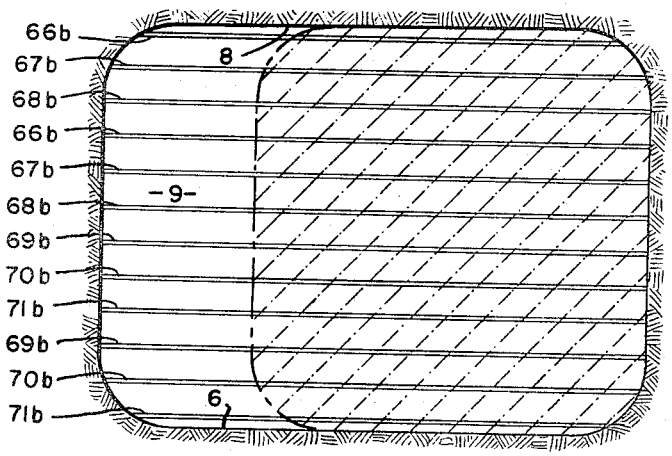

With the arm still in a horizontal position, the shaded portion of rock shown in FIGURE 6C is removed by the cutting head. One method of effecting this may be by sumping-in the cutting head, traversing in one direction, withdrawing the head, lowering the head, sumping-in again and traversing in the opposite direction and repeating this sequence of operations as many times as necessary.

Figure 6D:
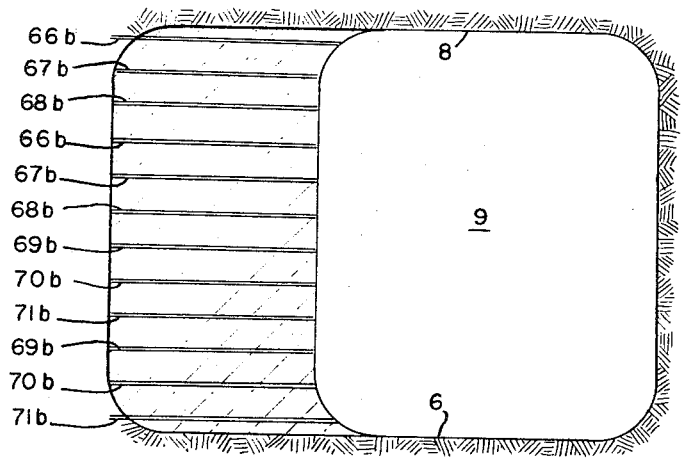

To remove the remaining portion of the rock, the arm is rotated through 180° and the procedure outlined previously is repeated, as shown shaded in FIGURE 6D.

A method of operating the machine to cut a D-section tunnel is shown in FIGURES 7A and 7B. With the arm in the horizontal position, kerfs 75a, 76a and 77a are made in the manner previously described. After kerfs 77 have been made the arm is rotated by equal increments (an angle of 15° is suitable) and kerfs 78 to 88 are made. Then, with the arm in the horizontal position, kerfs 75b, 76b and 77b are effected to complete the horizontal cutting. It then remains to remove the silt rock with the cutting head. This may be effected by making radial cuts, as shown shaded in FIGURE 7B, with the lower, horizontally kerfed rock removed as previously described with reference to a rectangular section tunnel.

The square and D-section tunnels require rotation of the arms by 180° only. If it is desired to cut circular section tunnels then the link arrangement described is unsuitable for rotation through 360°. One suitable modification is shown in FIGURE 8 in which the link mechanism is replaced and the torque shaft rotated by a slow speed hydraulic motor and reduction gearbox 89 having a pinion 90 driving an internally geared wheel 91 co-axial with and secured to the torque shaft used in exactly the same manner as that described with reference to the top portion of FIGURE 7B. However with a modified torque shaft drive such as that shown in FIGURE 8 complete rotation with 15° increments is achieved to produce a series of radial kerfs. The rock material is then removed with the cutting drum by making a radial cut, as shown shaded in FIGURE 9 in the manner described with reference to the top portion of FIGURE 7B.

To remove rock dislodged by the cutting head, the machine is provided with two transverse conveyors 92 capable of advancing and retracting with respect to the machine and provided with a pusher plate 93 such as described in my pending U.S. patent application Ser. No. 556,615. The transverse conveyors discharge on to a conveyor 94 running underneath the machine which in turn discharges on to a further conveyor (not shown) to displace the rock from the scene of tunnelling.

Diamond saws such as used in the civil engineering and quarrying industries, have been found quite suitable.

Thus the sawing technique, which may equally well be applied to heading and ripping mining machines, reduces the strength of the hard material by cutting the material into layers and the layers which then protrude in cantilever fashion are sheared off by the cutting head which applies a load greater than the cantilever beam strength of the material.

What I claim is:

1. A tunnelling machine comprising a frame normally having a horizontal longitudinal axis, a beam mounted transversely at the front of the frame and rotatable about said horizontal longitudinal axis, a pick-mounting cutting head rotatable about an axis parallel to the axis of rotation of the beam, an assembly of at least one rock-cutting circular saw rotatable about an axis transverse to the length of the beam, the cutting head and the saw assembly being slidably mounted on and movable lengthwise of the beam and means for rotating the beam about said horizontal longitudinal axis, for moving the cutting head and saw assembly along the beam, for rotating the cutting head and the saw assembly about their respective axes, and for advancing and retracting the cutting head and the saw assembly in the lengthwise direction of said horizontal longitudinal axis.

2. A tunnelling machine as in claim 1, wherein the beam is constituted by two smaller beams, one smaller beam being movable in a direction parallel to the longitudinal axis of the other smaller beam, the movable beam carrying the saw assembly and cutting head.

3. A tunnelling machine as in claim 1 wherein means are provided for shifting the beam axis vertically and horizontally so that tunnel sections other than circular may be cut.

4. A tunnelling machine as in claim 1 wherein the cutting head and the saw assembly are mounted for simultaneous movement along the beam, and in close proximity to one another.

5. A tunnelling machine as in claim 1 wherein the machine is self-advancing, by having the base carried by lengthwise supports spaced parallel to each other, together with floats and jacks to effect a "walking" movement forwards and backwards.

6. A tunnelling machine as in claim 1, wherein the machine also includes jacks to secure itself in the tunnel already cut, and thus to take the counter-thrusts arising from the advancing of one of the cutting head and saw assembly into the rock.

7. A tunnelling machine as in claim 1, wherein the machine incorporates conveying means for the removal of the rock that is being removed substantially continuously from the face.

8. A tunnelling machine comprising a frame normally having a horizontal longitudinal axis, a beam mounted transversely at the front of the frame and rotatable about said horizontal longitudinal axis, a pick-mounting cutting head rotatable about an axis parallel to the axis of rotation of the beam, an assembly of at least one rock-cutting circular saw rotatable about an axis transverse to the length of the beam, the cutting head and the saw assembly being slidably mounted on and movable lengthwise of the beam, an electric motor in the frame of the machine to drive at least one hydraulic pump serving a hydraulic motor geared to the cutting head, hydraulic cylinders for moving and locating the cutting head and saw assembly along the beam and for effecting their advance and retraction in the lengthwise direction of said horizontal longitudinal axis, hydraulic cylinders for rotating and locating the beam about said horizontal longitudinal axis of rotation, and an electric motor for rotating at least one circular saw.

9. A tunnelling machine as in claim 8, wherein the saw assembly is further advanceable and retractable independently, in addition to the cutting head and saw assembly being advanceable and retractable together, with respect to the lengthwise direction of the machine.

References Cited

UNITED STATES PATENTS

| | | | |
|---|---|---|---|
| 1,706,961 | 3/1929 | Morgan | 299—71 |
| 2,105,504 | 1/1938 | Ramsay | 299—10 |
| 3,288,532 | 11/1966 | Carver | 299—18 |

FOREIGN PATENTS

| | | |
|---|---|---|
| 562,095 | 11/1957 | Belgium. |
| 101,389 | 4/1962 | Netherlands. |

ERNEST R. PURSER, *Primary Examiner.*

U.S. Cl. X.R.

299—15, 57, 71